United States Patent
Ichinose

(10) Patent No.: US 8,447,899 B2
(45) Date of Patent: May 21, 2013

(54) SYSTEM, DEVICE, METHOD AND PROGRAM FOR EXCLUSIVELY CONTROLLING RESOURCES

(75) Inventor: Naoya Ichinose, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/014,149

(22) Filed: Jan. 26, 2011

(65) Prior Publication Data
US 2011/0119411 A1 May 19, 2011

Related U.S. Application Data

(63) Continuation of application No. PCT/JP2009/003541, filed on Jul. 28, 2009.

(30) Foreign Application Priority Data

Jul. 31, 2008 (JP) ................. 2008-198925

(51) Int. Cl.
- *G06F 3/00* (2006.01)
- *G06F 5/00* (2006.01)
- *G06F 13/42* (2006.01)

(52) U.S. Cl.
USPC ............... 710/36; 710/19; 710/38; 340/1.1

(58) Field of Classification Search
USPC ............................................. 710/19, 36, 38
See application file for complete search history.

(56) References Cited

U.S. PATENT DOCUMENTS

| | | | |
|---|---|---|---|
| 5,991,793 | A | 11/1999 | Mukaida et al. |
| 2008/0288693 | A1 | 11/2008 | Todoroki et al. |
| 2009/0170521 | A1 * | 7/2009 | Dubs et al. .............. 455/442 |
| 2009/0319700 | A1 * | 12/2009 | Cohn et al. .............. 710/19 |

FOREIGN PATENT DOCUMENTS

| | | |
|---|---|---|
| JP | 5-233561 | 9/1993 |
| JP | 2002-207714 | 7/2002 |
| JP | 2003-173326 | 6/2003 |
| JP | 2007-141155 | 6/2007 |
| JP | 2007-219800 | 8/2007 |
| JP | 2007-251644 | 9/2007 |
| JP | 2007-306318 | 11/2007 |

OTHER PUBLICATIONS

Tecore Networks, Intelligent Network Access Controller, p. 1 of 2, Jun. 18, 2008.*
Carl Malamud, A Better Communication System for Emergency Workers, Center for American Progress, pp. 1-4, Oct. 6, 2006.*
A full machine translation of JP 2007-141155.
A full machine translation of JP 2007-251644.

* cited by examiner

*Primary Examiner* — Chun-Kuan Lee
*Assistant Examiner* — Brooke Taylor
(74) *Attorney, Agent, or Firm* — Greenblum & Bernstein, P.L.C.

(57) ABSTRACT

A device, which has not obtained a resource, can securely obtain a required resource without degradation in response to resource obtainment, and obtains the resource which is exclusively controlled between the device and another device. The device includes: a status detector which detects a status of the other device; a resource obtainer which includes flag information and obtains the resource based on the flag information, the flag information indicating whether the obtainment of the resource is permitted or prohibited; and a determiner which switches the flag information to indicate whether the obtainment is permitted or prohibited, based on the status of the other device detected by the status detector. The resource obtainer is prohibited from obtaining the resource when the flag information indicates that the obtainment is prohibited.

19 Claims, 15 Drawing Sheets

SYSTEM, DEVICE, METHOD AND PROGRAM FOR EXCLUSIVELY CONTROLLING RESOURCES

CROSS REFERENCE TO RELATED APPLICATION

This is a continuation application of PCT application No. PCT/JP2009/003541 filed on Jul. 28, 2009, designating the United States of America.

BACKGROUND OF THE INVENTION (1) Field of the Invention

The present invention relates to systems, devices, methods, and programs for exclusively controlling resources, and in particular, to a system, a device, a method, and a program which require an exclusive control of resources.

(2) Description of the Related Art

In a communication control system, an exclusive control of resources is generally performed so as to prevent a single resource in the communication control system from being accessed by a plurality of terminals at the same time.

For example, in the case of mobile terminals communicating with a base station, there is a limit in the number of mobile terminals (communication resources) that can be connected with the base station at the same time. Thus, even if an urgent communication is required in the event of an emergency, such as a disaster, communication resources may be insufficient, not allowing the communication to the required emergency contact.

In order to address such problems, there is a proposed technique which allows continuation of communication to an emergency contact (See Patent Literature 1: Japanese Patent Application Publication No. 2007-251644). In the technique, when a mobile terminal makes a call, a present location and a destination of the mobile terminal are notified as a location information notifying signal so as to reserve communication resources of communication base stations existing on a traveling route from the present location to the destination.

Furthermore, in recent years, processors referred to as multi-task processors which can process a plurality of tasks in parallel (hereinafter, collectively referred to as "multi-processors") have started to be used. Thus, techniques of exclusive control of resources in the multi-processors have also been studied.

For example, there is a proposed technique for exclusively controlling resources in a multi-processor (see Patent Literature 2: Japanese Patent Application Publication No. 2007-219800). The technique includes the following steps: an interrupt inhibit step for inhibiting the execution of a task from being interrupted in a unit processor on which the task is executing; an exclusive control step for performing an exclusive control between the unit processor and other unit processors by acquiring an inter-unit processor lock after the interrupt inhibit step causes a unit processor interrupt inhibit state; and an external interrupt inhibit step for inhibiting the performance of interrupt handling requested from the outside after the exclusive control step performs the exclusive control between the unit processor and the other unit processors.

However, the conventional technique disclosed by Patent Literature 1 is based on an assumption that a mobile terminal has already established communications with a base station. Therefore, for example, in the case where an emergency communication needs to be made by a mobile terminal that has not yet established communications with the base station, the communication to the emergency contact cannot be established, which is not effective.

The conventional technique disclosed by Patent Literature 2 requires a step for inhibiting an interrupt from the outside at the time of performing an exclusive control in a multi-processor, which results in a degraded response to the interruption. In particular, real-time capability is important for an embedded appliance having a multi-processor; and thus, the degraded interrupt response in the exclusive control of resources may lead to a major problem.

The present invention has been conceived in view of the above, and has an object to provide a system, a device, a method, and a program for exclusively controlling resources which allow a device which has not yet obtained a resource to secure the necessary resource without degrading response to resource obtainment.

SUMMARY OF THE INVENTION

In order to solve the problems, a device according to an aspect of the present invention is a device which obtains a resource which is exclusively controlled between the device and an other device. The device includes: a status detecting unit which detects a status of the other device; a resource obtaining unit which includes flag information and obtains the resource based on the flag information, the flag information indicating whether the obtainment of the resource is permitted or prohibited; and a switch determining unit which switches the flag information to indicate whether the obtainment is permitted or prohibited, based on the status of the other device detected by the status detecting unit, wherein the resource obtainment unit is prohibited from obtaining the resource when the flag information indicates that the obtainment is prohibited.

With the structure, it is possible for the device to obtain a resource based on the flag information switched depending on the status of another device. In other words, in the case where a device which has not yet obtained a resource, it is possible to obtain the resource without inquiring whether or not obtainment of the resource is possible, when the flag information indicates that the obtainment of the resource is permitted. More specifically, the necessary resource can be secured without the degraded obtainment response that is inquiring of whether or not the obtainment of the resource is permitted. More specifically, when a device is a communication terminal, a device, which is in a status where communication has not been yet established, can also establish communication to the emergency contact without the degraded response.

Furthermore, according to the flag information switched depending on at least the status of another device, the obtainment of the resource is permitted or prohibited. As a result, an exclusive control of the resources is achieved.

According to the present invention, it is possible to achieve a system, a device, a method, and a program for exclusively controlling resources which allow a device, which has not yet obtained a resource, to ensure the necessary resource, without degrading resource obtainment response. For example, when a device is a communication terminal, the communication terminal includes a unit for detecting a status of another communication terminal so that a resource can be obtained depending on the status of the other communication terminal. As a result, for example, a communication terminal, which is in the status where communication has not been established, can also establish an emergency communication without degraded response. Furthermore, when a device is a processor, it is possible for a multi-processor to obtain a resource depending on the status of another processor without degrading real-time capability. As a result, processing can be executed without degraded real-time capability.

FURTHER INFORMATION ABOUT TECHNICAL BACKGROUND TO THIS APPLICATION

The disclosure of Japanese Patent Application No. 2008-198925 filed on Jul. 31, 2008 including specification, drawings and claims is incorporated herein by reference in its entirety.

The disclosure of PCT application No. PCT/JP2009/003541 filed on Jul. 28, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Hereinafter, Embodiments of the present invention will be described in detail with reference to the drawings.

(Embodiment 1)

Figure 1:
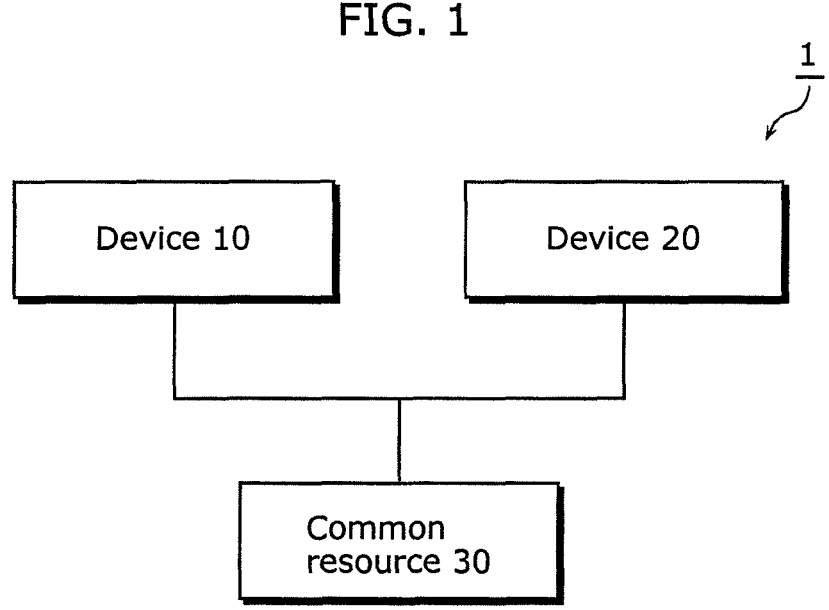
FIG. 1 is a diagram illustrating an example of a system configuration of a resource exclusion system 1 according to Embodiment 1 of the present invention.

FIG. 1 is a diagram illustrating an example of a system configuration of a resource exclusion system 1 according to Embodiment 1 of the present invention.

The resource exclusion system 1 shown in FIG. 1 includes a plurality of devices that are devices 10 and 20, and a common resource 30.

The common resource 30 includes a resource which requires an exclusive control performed between the devices, and provides the device 10 or 20 with the resource. The common resource 30 is capable of providing only one of the devices 10 and 20 with the resource. For example, when the device 10 obtains a resource from the common resource 30, an exclusive control of the resource needs to be performed such that the resource is not provided to the device 20 that has a possibility to obtain the resource from the common resource 30.

Each of the devices 10 and 20 includes a hardware or a software, or both of the hardware and the software. Specific examples of the devices 10 and 20 include: a mobile terminal or a communication terminal, such as a mobile phone, a Personal Handyphone System (PHS), a Personal Digital Assistants (PDA), a digital camera, a handheld game console, or a laptop; a fixed terminal, such as a television, a DVD recorder, or a desktop computer; and a multi-processor which is capable of processing a plurality of tasks in parallel in an embedded appliance or the like.

The devices 10 and 20 obtain a resource from the common resource 30.

Figure 2:
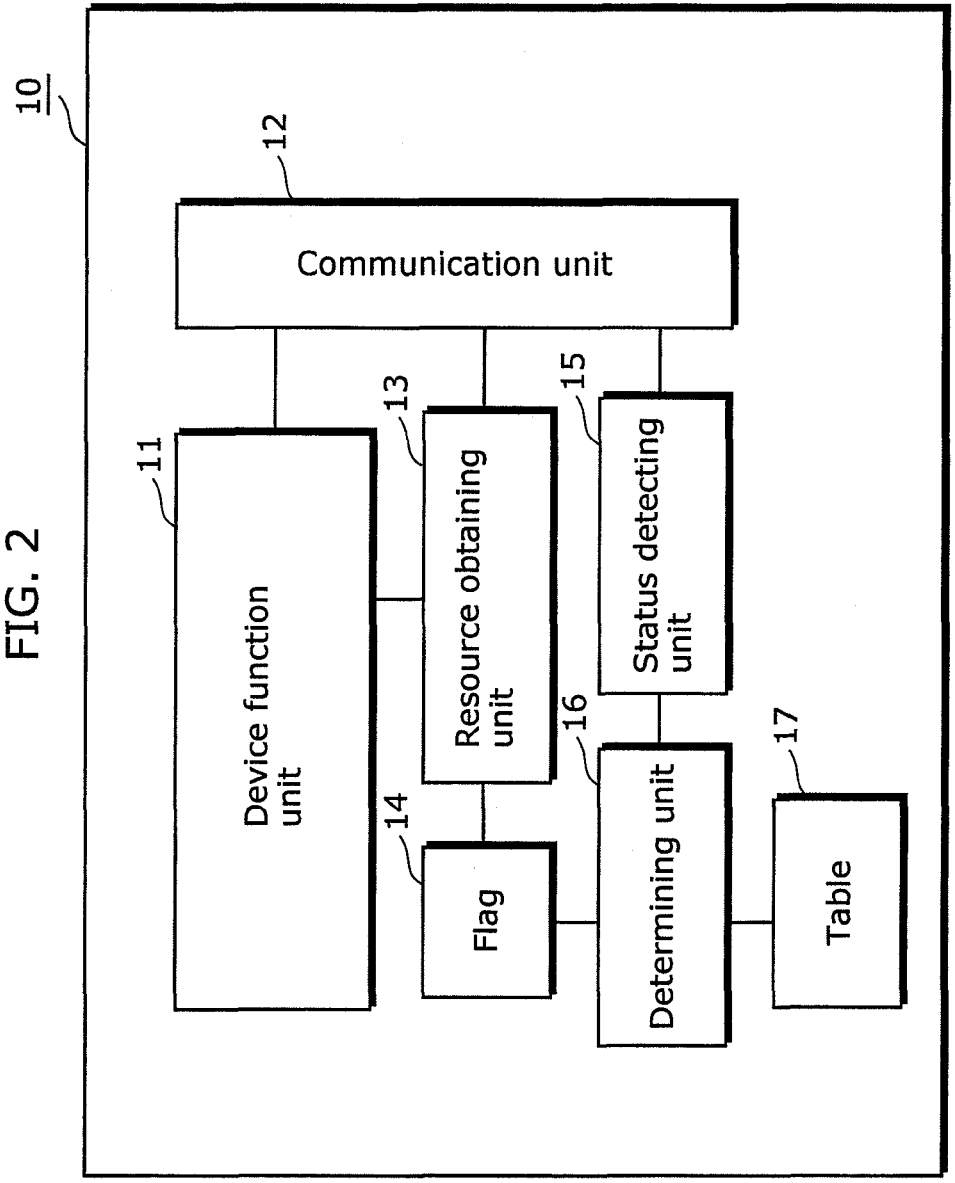
FIG. 2 is a block diagram illustrating an example of a configuration of a device 10 according to the present invention.

FIG. 2 is a block diagram illustrating an example of a configuration of the device 10 according to the present invention.

The device 10 shown in FIG. 2 includes: a device function unit 11 which exercises functions of the device 10; a communication unit 12 which communicates with the common resource 30; a resource obtainment unit 13 which obtains a resource from the common resource 30; a flag 14; a status detecting unit 15 which detects a status of the device 20; and a determining unit 16.

The device function unit 11 exercises functions of the device 10. Examples of the functions include, in the case of a mobile phone, a function for making a call, such as a speaker, an internal microphone, push buttons used for designating telephone numbers or the like.

The communication unit 12 communicates with the common resource 30.

The resource obtaining unit 13 obtains a resource from the common resource 30. The resource obtaining unit 13 refers to the flag 14, and obtains a resource from the common resource 30 when the flag 14 indicates that the obtainment of the resource is permitted.

The flag 14 indicates whether the obtainment is permitted or prohibited, and indicates whether or not the resource obtaining unit 13 is permitted to obtain a resource from the common resource 30.

The status detecting unit 15 detects the status of the other device, that is, the status of the device 20.

The determining unit 16 determines whether or not the resource obtaining unit 13 is permitted to obtain the resource, based on the status of the other device 20 detected by the status detecting unit 15. Based on the determination result, the determining unit 16 switches the flag 14 to indicate whether the obtainment is permitted or prohibited.

The determining unit 16 also includes a table 17. The determining unit 16 refers to information indicated by the table 17 to determine based on the status of the other device 20, whether or not the resource obtainment unit 13 is permitted to obtain the resource.

Here, for example, the table 17 holds priorities of the devices 10 and 20 that can obtain a resource from the common resource 30. Furthermore, for example, the table 17 holds information indicating that the status where the device 20 obtained a resource from the common resource 30 within a predetermined period is the status where the resource is not to be obtained for a predetermined period". In this case, the determining unit 16 determines that the resource obtaining unit 13 is permitted to obtain the resource.

Figure 3:
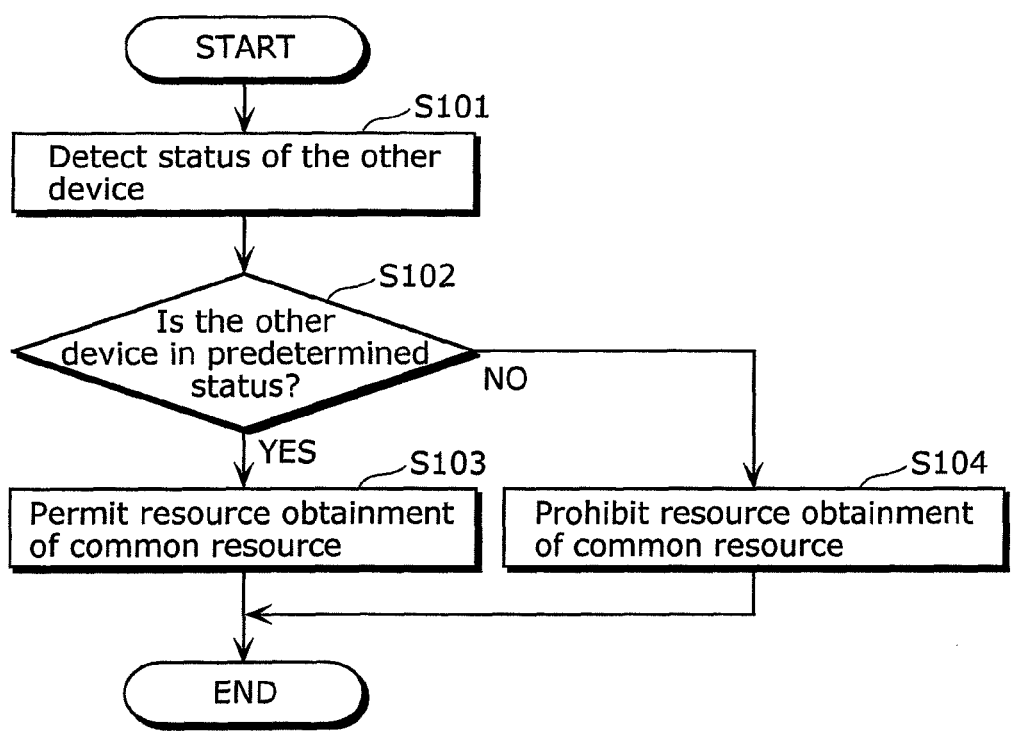
FIG. 3 is a flowchart of processing performed in the resource exclusion system 1 according to the present invention.

FIG. 3 is a flowchart of processing performed in the resource exclusion system 1 according to the present invention.

An example will be described where the device 10 makes a communication request to the common resource 30 in the resource exclusion system 1 shown in FIG. 1.

First, the status detecting unit 15 of the device 10 detects the status of the device 20 that is the other device which has a possibility to communicate with the common resource 30 (S101).

Next, the determining unit 16 of the device 10 determines whether or not the status of the device 20 detected by the status detecting unit 15 is a predetermined status (S102).

When determined that the status of the device 20 detected by the status detecting unit 15 is a predetermined status (Yes in S102), the determining unit 16 switches the flag 14 to indicate that the resource obtaining unit 13 of the device 10 is permitted to obtain the resource form the common resource 30 (S103). In this case, the resource obtaining unit 13 of the device 10 obtains the resource form the common resource 30 via the communication unit 12.

When determined that the status of the device 20 detected by the status detecting unit 15 is not a predetermined status (No in S102), the determining unit 16 switches the flag 14 to indicate that the resource obtaining unit 13 of the device 10 is prohibited from obtaining the resource form the common resource 30 (S104). In this case, the resource obtaining unit 13 of the device 10 cannot obtain the resource form the common resource 30. This allows the device 20 to secure obtainment of the resource from the common resource 30 without requiring the device 20 to inquire the common resource 30 if the resource can be obtained, that is, without degraded response.

In such a manner, the resource exclusion system 1, including the devices 10 and 20 and the common resource 30, performs resource exclusion. Accordingly, the device 10 can obtain a resource from the common resource 30 depending on the status of the device 20 that is the other device.

In Embodiment 1, it has been described that the device 10 obtains a resource from the common resource 30 depending on the status of the device 20; however, the present invention is not limited to the example. The device 20 may obtain a resource from the common resource 30 depending on the status of the device 10. In this case, the device 20 has the configuration same as that of the device 10 shown in FIG. 2.

Furthermore, in Embodiment 1, it has been described that the status detecting unit 15 is included in the device 10; however, the status detecting unit 15 may be included in the common resource 30 instead. In this case, the common resource 30 detects the status of the device 10 or 20.

As described, according to Embodiment 1, the device 10 can obtain a resource from the common resource 30 depending on the status of the other device 20.

In Embodiment 1, the example has been described where the devices 10 and 20 and the common resource 30 are included in the system; however, the present invention may be applied to any systems as long as the system include a plurality of devices and a finite resource which requires K-mutual exclusion between the devices.

(Embodiment 2)

Next, Embodiment 2 of the present invention will be described. Here, a resource exclusion system 100 that is a specific implementation of the resource exclusion system 1 according to Embodiment 1.

Embodiment 2 differs from Embodiment 1 in that the device 10 is implemented as a communication terminal 101, the device 20 is implemented as a communication terminal 102, and the common resource 30 is implemented as a base station 103. The communication terminals according to Embodiment 2 have a feature that a resource can be obtained depending on the status of the other communication terminal, similar to Embodiment 1.

Figure 4:
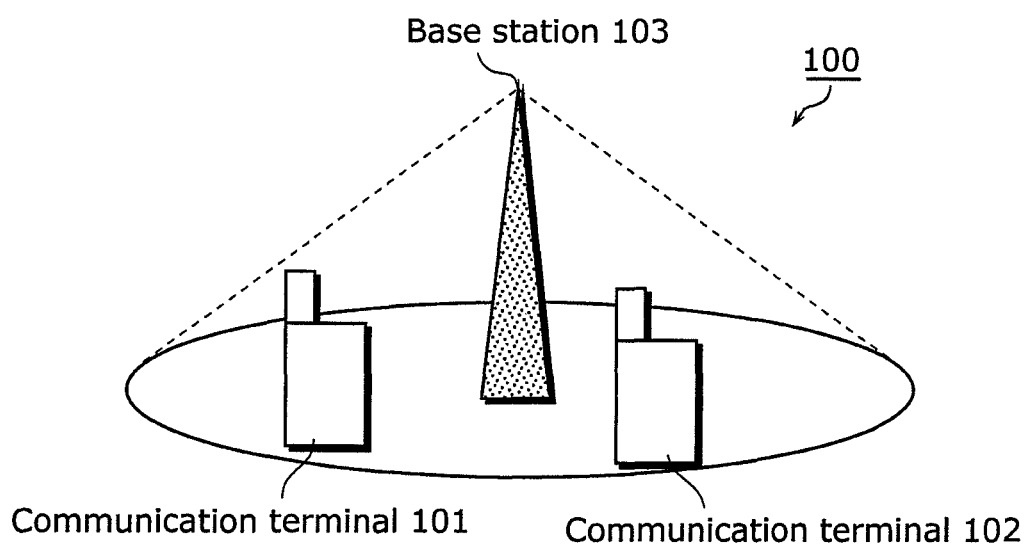
FIG. 4 is a diagram illustrating an example of a system configuration of a resource exclusion system 100 according to Embodiment 2 of the present invention.

FIG. 4 is a diagram illustrating an example of a system configuration of the resource exclusion system 100 according to Embodiment 2 of the present invention.

The resource exclusion system 100 shown in FIG. 4 includes the communication terminals 101 and 102, and the base station 103.

The communication terminals 101 and 102 are terminals that can communicate, such as a mobile phone, PHS, and PDA, and obtains a communication resource from the base station 103.

The base station 103 includes a communication resource that is a resource which requires exclusive control between a plurality of terminals, and exclusively provides the communication terminal 101 or 102 with the communication resource. More specifically, the base station 103 is capable of communicating only one of the communication terminal 101 or 102 at a time. Thus, when the communication terminal 101 communicates with the base station 103, an exclusive control needs to be performed on the communication terminal 102 which has a possibility to communicate with the base station 103 at the same time.

Figure 5:
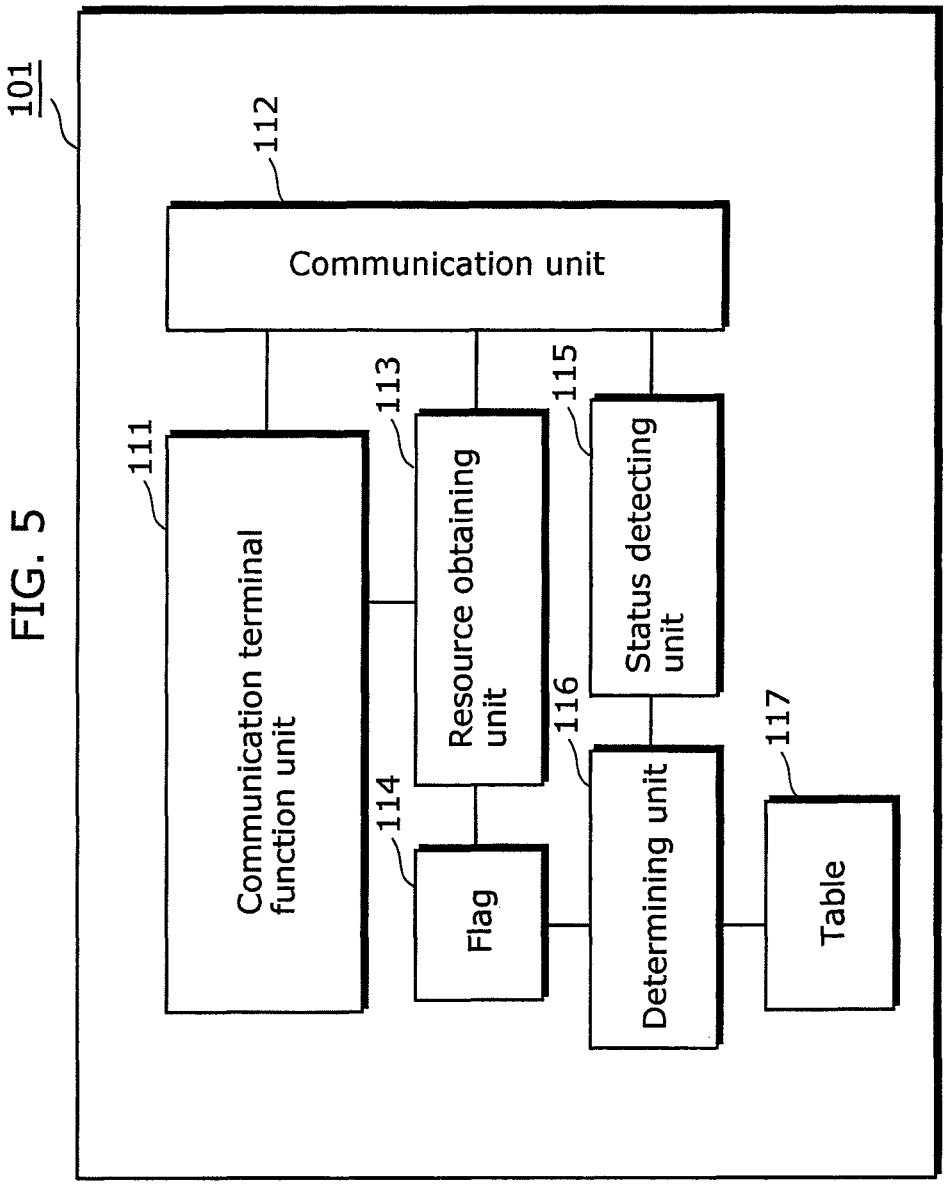
FIG. 5 is a block diagram illustrating an example of a configuration of a communication terminal 101 according to Embodiment 2 of the present invention.
Figure 6:
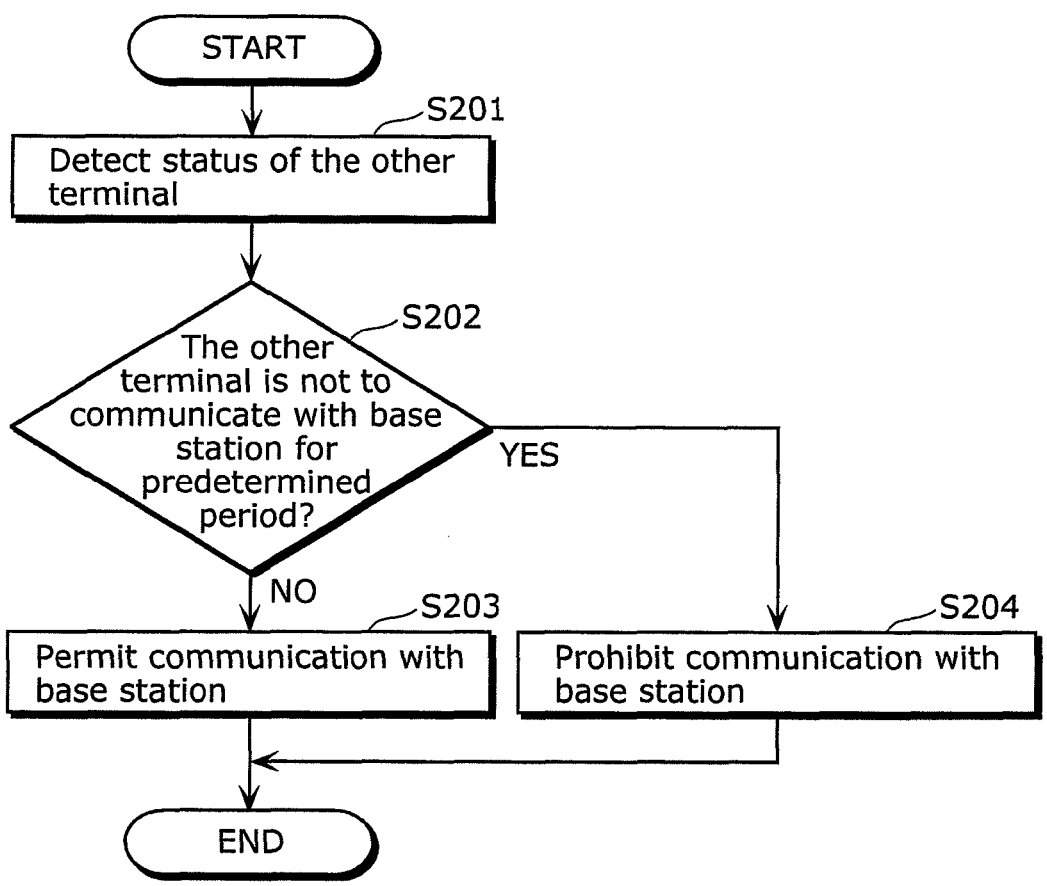
FIG. 6 is a flowchart showing an example of processing performed in the resource exclusion system 100 according to Embodiment 2 of the present invention.

FIG. 5 is a block diagram illustrating an example of a configuration of the communication terminal 101 according to Embodiment 2 of the present invention.

The communication terminal 101 shown in FIG. 5 includes: a communication terminal function unit 111 which exercises functions of the communication terminal 101; a communication unit 112 which communicates with the base station 103; a resource obtaining unit 113 which obtains a communication resource from the base station 103; a flag 114; a status detecting unit 115 which detects the status of the communication terminal 102; and a determining unit 116.

The communication terminal function unit 111 exercises the functions of the communication terminal 101. Examples of the communication functions include a function, in the case of a mobile phone, for making a call such as a speaker, an internal microphone, push-buttons for designating telephone numbers and the like.

The communication unit 112 communicates with the base station 103.

The resource obtaining unit 113 obtains a communication resource from the base station 103 via the communication unit 112. The resource obtaining unit 113 refers to the flag 114 and obtains the communication resource from the base station 103 when the flag 114 indicates that the obtainment of the communication resource is permitted.

The flag 114 indicates whether the obtainment is permitted or prohibited, and indicates whether or not the resource obtaining unit 113 is permitted to obtain the communication resource from the base station 103.

The status detecting unit 115 detects the status of the other communication terminal, that is, the status of the communication terminal 102.

The determining unit 116 determines whether or not the resource obtaining unit 113 is permitted to obtain the communication resource, based on the status of the other communication device 102 detected by the status detecting unit 115. Based on the determination result, the determining unit 116 switches the flag 114 to indicate whether the obtainment is permitted or prohibited.

The determining unit 116 also includes a table 117. The determining unit 116 refers to information indicated by the table 117, and determines whether or not the resource obtainment unit 113 is permitted to obtain the resource, based on the status of the other communication terminal 102.

Here, for example, the table 117 indicates the status of the communication terminal 102, and priority according to the status of the communication terminal 102. Furthermore, for example, the table 117 indicates that the status where the communication terminal 102 obtained the resource from the base station 103 within a predetermined period is the status where the resource is not to be obtained for a predetermined period. In this case, the determining unit 116 determines that the resource obtaining unit 113 is permitted to obtain the resource.

Next, processing performed in the resource exclusion system 100 will be described. An example will be described where the communication terminal 101 makes a communication request to the base station 103 in the resource exclusion system 100 shown in FIG. 4.

FIGS. 6 to 9 are flowcharts showing examples of processing performed in the resource exclusion system 100 according to Embodiment 2 of the present invention. In the resource exclusion system 100 shown in FIG. 4, it is assumed that the communication terminal 101 makes a communication request to the base station 103.

First, the status detecting unit 115 of the communication terminal 101 detects the status of the communication terminal 102 that is the other terminal which has a possibility to communicate with the base station 103 (S201).

Next, the determining unit 116 of the communication terminal 101 determines if the status of the communication terminal 102 detected by the status detecting unit 115 is the status where communication is not to be made with the base station 103 for a predetermined period from the detected time (S202).

Only when determined that the status of the communication terminal 102 detected by the status detecting unit 115 is the status where communication is not to be made with the base station 103 for a predetermined period from the detected time (No in S202 in FIG. 6), the determining unit 116 switches the flag 114 to indicate that the resource obtaining unit 113 is permitted to obtain a communication resource from the base station 103 (S203). In this case, the resource obtaining unit 113 of the communication terminal 101 is permitted to communicate with the base station 103. In other words, the resource obtaining unit 113 of the communication terminal 101 obtains the communication resource from the base station 103 via the communication unit 112.

When determined that the status of the communication terminal 102 detected by the status detecting unit 115 is the status where communication is to be made with the base station 103 for a predetermined period" from the detected time (Yes in S202 in FIG. 6), the determining unit 116 switches the flag 114 to indicate that the resource obtaining unit 113 of the communication terminal 101 is prohibited from obtaining the communication resource from the base station 103 (S204). In this case, the resource obtaining unit 113 cannot obtain the communication resource from the base station 103. This secures the communication between the communication terminal 102 and the base station 103 without requiring the communication terminal 102 to inquire the base station 103 if the resource can be obtained, that is, without degraded response.

In such a manner, the resource exclusion system 100 performs resource exclusion.

Figure 7:
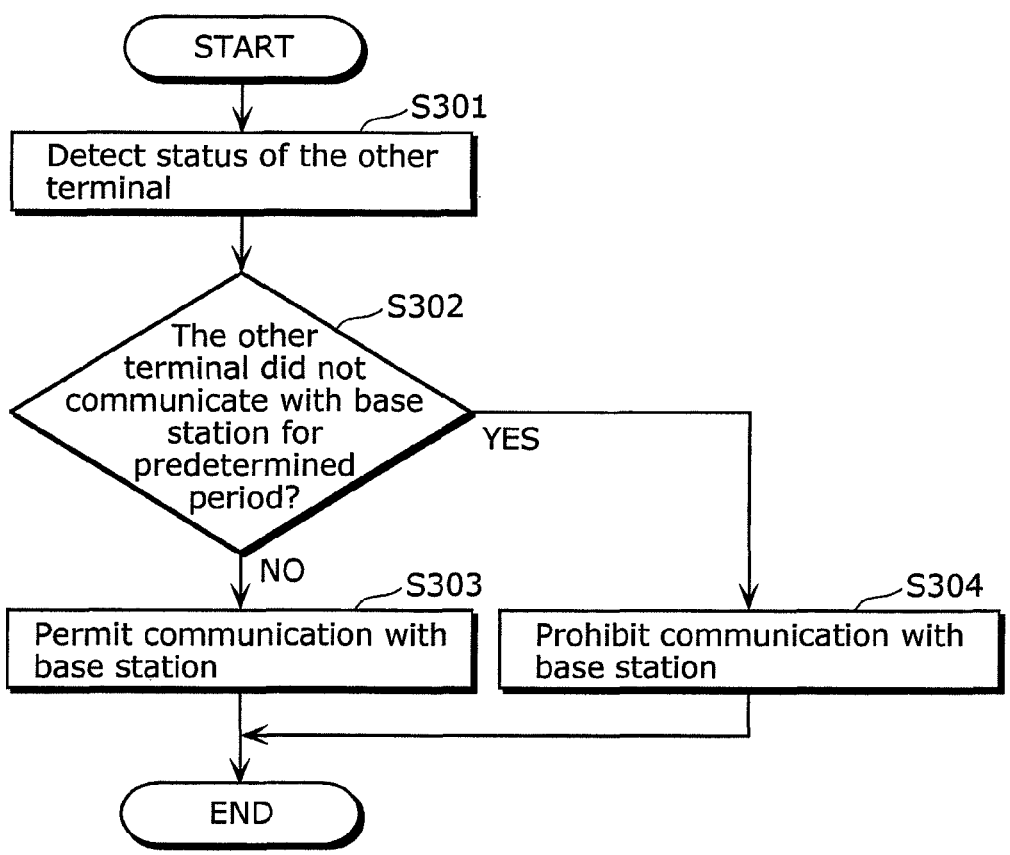
FIG. 7 is a flowchart showing an example of processing performed in the resource exclusion system 100 according to Embodiment 2 of the present invention.

Here, in order to determine that the status of the communication terminal 102 detected by the status detecting unit 115 is the status where communication is not to be made with the base station for a predetermined period, for example, the status detecting unit 115 may include a communication history unit which records communication history of the communication terminal 102. In this case, the communication terminal 101 performs the resource exclusion as shown in FIG. 7, using the communication history of the communication terminal 102 held by the communication history unit.

First, the status detecting unit 115 detects the status of the communication terminal 102 that is the other terminal which has a possibility to communicate with the base station 103 (S301). Here, the status detecting unit 115 determines whether or not the communication terminal 102 is the terminal which continuously communicates with the base station 103, based on the communication history of the communication terminal 102 held by the communication history unit.

Next, when the status detecting unit 115 determines that the communication terminal 102 is the terminal which continuously communicates with the base station 103, the determining unit 116 determines if the status of the communication terminal 102 detected by the status detecting unit 115 is the status where communication was not made with the base station 103 for a predetermined time from the detected time (S302).

Only when the status of the communication terminal 102 detected by the status detecting unit 115 is the status where communication was not made with the base station 103 for a predetermined period from the time detected by the status detecting unit 115 (No in S302 in FIG. 7), the determining unit 116 switches the flag 114 to indicate that the resource obtaining unit 113 is permitted to obtain a communication resource from the base station 103 (S303). In this case, the resource obtaining unit 113 of the communication terminal 101 is permitted to communicate with the base station 103. In other words, the resource obtaining unit 113 of the communication terminal 101 obtains the communication resource from the base station 103 via the communication unit 112. Since S304 is the same as S204, its description is omitted.

In such a manner, the resource exclusion system 100 performs resource exclusion.

In the resource exclusion processing shown in FIG. 7, the communication terminal 102 is a terminal which continuously communicates with the base station 103. Thus, in the case where communication was not made with the base station 103 for a predetermined period, it is determined that communication is not to be made with the base station 103 for a predetermined period from the time detected by the status detecting unit 115.

Figure 8:
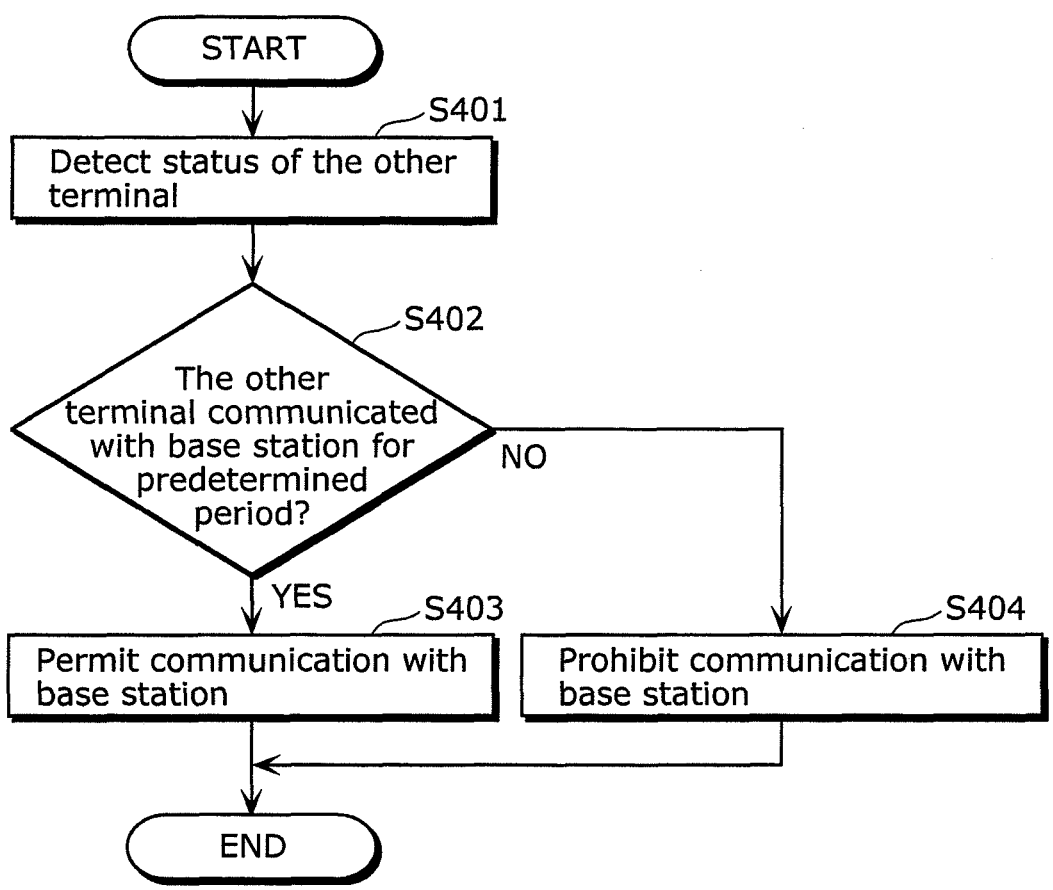
FIG. 8 is a flowchart showing an example of processing performed in the resource exclusion system 100 according to Embodiment 2 of the present invention.

On the other hand, in the case where it is determined that the communication terminal 102 is a terminal which does not continuously communicate with the base station 103 based on the communication history of the communication terminal 102 held by the communication history unit, the communication terminal 101 performs resource exclusion processing as shown in FIG. 8.

First, the status detecting unit 115 detects the status of the communication terminal 102 that is the other terminal which has a possibility to communicate with the base station 103 (S401). Here, the status detecting unit 115 determines whether or not the communication terminal 102 is a terminal which does not continuously communicate with the base station 103, based on the communication history of the communication terminal 102 held by the communication history unit.

Next, when the status detecting unit 115 determines that the communication terminal 102 is the terminal which does not continuously communicate with the base station 103, the determining unit 116 determines whether or not the status of the communication terminal 102 detected by the status detecting unit 115 is the status where communication was made with the base station 103 for a predetermined time from the detected time (S402).

Only when the status of the communication terminal 102 detected by the status detecting unit 115 is the status where communication was made with the base station 103 for a predetermined period from the detected time (Yes in S402), the determining unit 116 switches the flag 114 to indicate that the resource obtaining unit 113 can obtain a communication resource from the base station 103 (S403). In this case, the resource obtaining unit 113 of the communication terminal 101 is permitted to communicate with the base station 103. In other words, the resource obtaining unit 113 of the communication terminal 101 obtains the communication resource from the base station 103 via the communication unit 112. Since S404 is the same as S204 and S304, its description is omitted.

In such a manner, the resource exclusion system 100 performs resource exclusion.

In the resource exclusion processing shown in FIG. 8, the communication terminal 102 is a terminal which does not continuously communicate with the base station 103. Thus, in the case where the communication was made with the base station 103 for a predetermined period, it is determined that communication is not to be made with the base station 103 for a predetermined period from the time detected by the status detecting unit 115.

Figure 9:
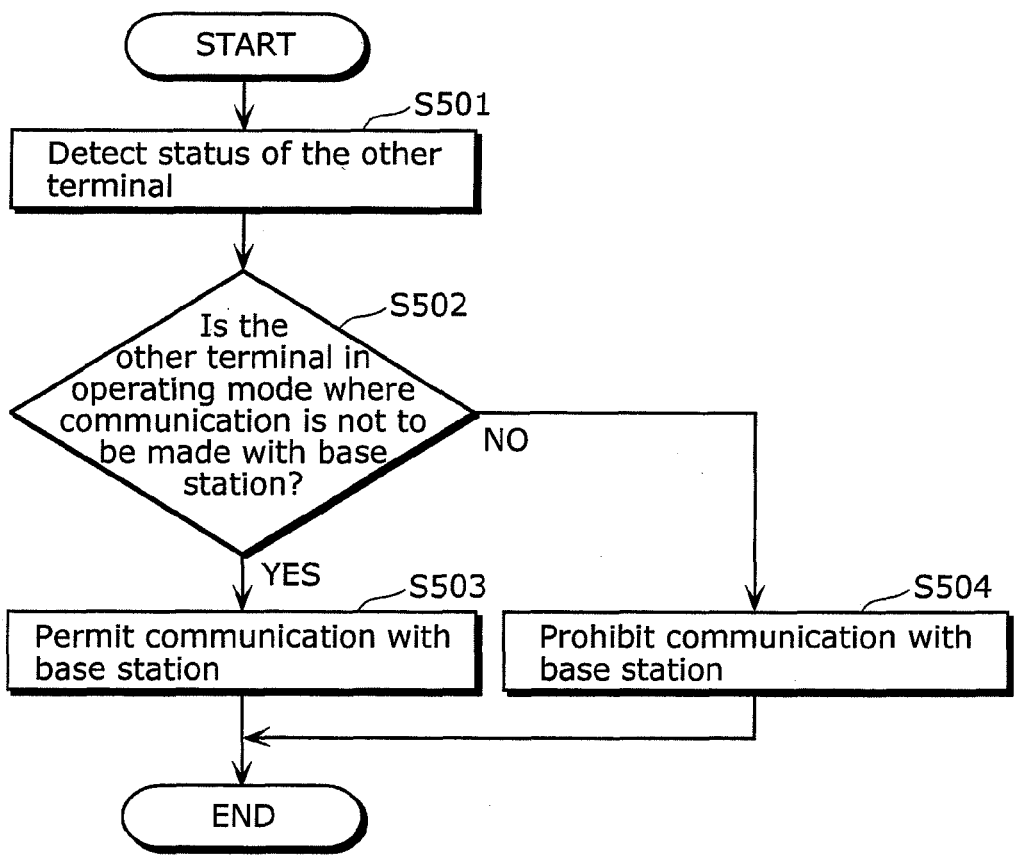
FIG. 9 is a flowchart showing an example of processing performed in the resource exclusion system 100 according to Embodiment 2 of the present invention.

The communication terminal 101 may perform resource exclusion processing as shown in FIG. 9, by detecting, as the status of the communication terminal 102, the status of the operating mode where communication is not to be made with the base station 103.

First, the status detecting unit 115 detects the status of the communication terminal 102 that is the other terminal which has a possibility to communicate with the base station 103 (S501).

Next, the determining unit 116 determines if the status of the communication terminal 102 detected by the status detecting unit 115 is in the operating mode where communication is not to be made with the base station 103 (S502).

Only when the status of the communication terminal 102 detected by the status detecting unit 115 is in the operating mode where communication is not to be made with the base station 103 (Yes in S502), the determining unit 116 switches the flag 114 to indicate that the communication terminal 101 is permitted to communicate with the base station 103 (S503).

Since S504 is the same as S204, S304, and S404, its description is omitted.

In such a manner, the resource exclusion system 100 performs resource exclusion.

In the resource exclusion processing shown in FIG. 9, when the status of the communication terminal 102 is in the operating mode where communication is not to be made with the base station 103, it is determined that the communication terminal 102 or the processor included in the communication terminal 102 is not to communicate with the base station 103 for a predetermined period from the time detected by the status detecting unit 115.

Figure 10:
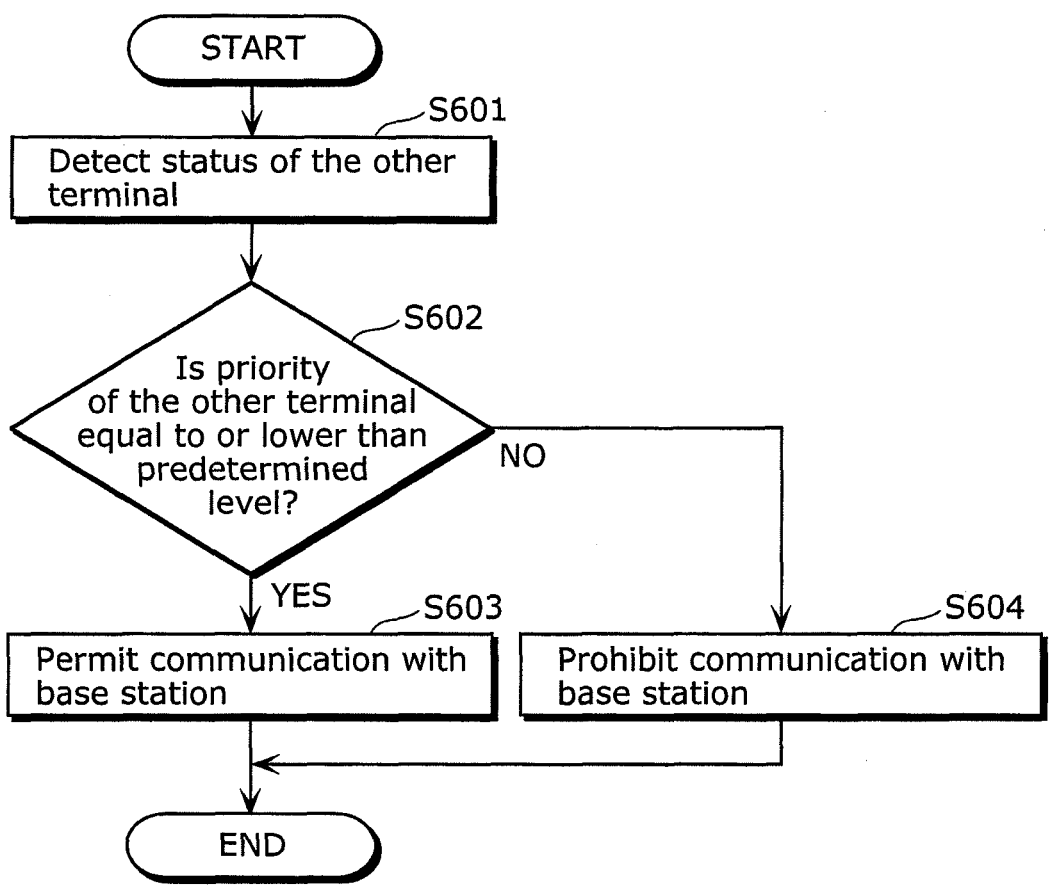
FIG. 10 is a flowchart showing an example of processing performed in the resource exclusion system 100 according to Embodiment 2 of the present invention.

The communication terminal 101 may hold priorities of the communication terminals 101 and 102 in the table 117 so as to perform resource exclusion processing as shown in FIG. 10.

For example, by holding the priories of the communication terminals 101 and 102 in the table 117, it is possible for the communication terminal 101 or 102 to secure communication with the base station 103 depending on the emergency level of the respective terminals (communication terminals 101 and 102). Specific Example is described with reference to FIG. 10.

FIG. 10 is a flowchart showing an example of processing performed in the resource exclusion system 100 according to Embodiment 2 of the present invention.

In the resource exclusion system 100 shown in FIG. 4, it is assumed that the communication terminal 101 makes a communication request to the base station 103. Each of the communication terminals 101 and 102 holds priority of at least its own terminal. The priority indicates the priority level of the terminal which can obtain a communication resource from the base station 103. Here, the priorities of the terminals held by the communication terminals 101 and 102 define priority order of the respective terminals, and are determined depending on the emergency level and the like. For example, the table 117 holds the priority of the communication terminal 101. The priority indicates the priority level of the terminal which can obtain a communication resource from the base station 103.

First, the status detecting unit 115 of the communication terminal 101 detects the status of the communication terminal 102 that is the other terminal which has a possibility to communicate with the base station 103 (S601).

Next, the determining unit 116 determines whether or not the status of the communication terminal 102 detected by the status detecting unit 115 is the status where the priority of the communication terminal 102 is equal to or lower than a predetermined level (S602).

Only when the status of the communication terminal 102 detected by the status detecting unit 115 is the status where the priority of the communication terminal 102 is equal to or lower than a predetermined level (Yes in S602), the determining unit 116 switches the flag 114 to indicate that the resource obtaining unit 113 is permitted to obtain a communication resource from the base station 103 (S603). In this case, the resource obtaining unit 113 of the communication terminal 101 is permitted to communicate with the base station 103. In other words, the resource obtaining unit 113 obtains the communication resource from the base station 103 via the communication unit 112. Since S604 is the same as S204, its description is omitted.

In such a manner, the resource exclusion system 100 performs resource exclusion.

According to the resource exclusion processing shown in FIG. 10, it is possible to secure communication of terminals having an emergency level equal to or higher than a predetermined level.

The priority equals to or lower than a predetermined level may be the priority held by the communication terminal 101. This secures the communication depending on the priority of the communication terminal 101 or 102.

The priorities held by the communication terminals 101 and 102 may be dynamically changed depending on the usage status. For example, the priority may be determined by recording a history of communication detail of the terminal (communication terminal 101 or 102) and determining the emergency level of the terminal from the history. This allows the priority to be set depending on the usage status.

Furthermore, the priority held by the communication terminal 101 may be changed by its own user and the priority held by the communication terminal 102 may be changed by its own user. For example, at the time of disaster or the like, the priority of the terminal to be used may be set high by the user of the terminal. This allows the user to make setting for securing the communication at the time of disaster.

The status of the communication terminal 102, which is a condition for permitting the communication terminal 101 to communicate with the base station 103, may be changed by the user of the terminal.

Furthermore, the status of the communication terminal 102, which is a condition for permitting the communication terminal 101 to communicate with the base station 103, may be dynamically changed depending on circumstances or the like. For example, this allows an administrator of the base station 103 to change the conditions for the terminals that can communicate, thereby setting most appropriate conditions depending on circumstances, such as normal times, or disaster.

As described, according to Embodiment 2, the resource can be obtained depending on the status of the other communication terminal. More specifically, by including, in the communication terminal, a unit for detecting the status of the other communication terminal so as to obtain a communication resource depending on the status of the other communication terminal, a communication terminal that is, for example, in the status where communication has not been established can also make an emergency contact.

In Embodiment 2, it has been described that the status detecting unit 115 of the communication terminal 101 detects the status of the other communication terminal, that is, the status of the communication terminal 102. However, the status of the communication terminal 102 may be detected directly by the communication terminal 101 as described above, or may be detected by the base station 103.

Furthermore, in Embodiment 2, the example has been described where the system includes the communication terminals and the base station; however, the present invention may be applied to any systems as long as the system include a plurality of terminals and a finite resource which requires k-mutual exclusion between the terminals.

(Embodiment 3)

Next, Embodiment 3 of the present invention will be described. Here, a multi-processor system 200 is described which is another specific implementation of the resource exclusion system 1 according to Embodiment 1.

Embodiment 3 differs from Embodiment 1 in that the device 10 is implemented as a processor 201, the device 20 is implemented as a processor 202, and the common resource 30 is implemented as the common resource 203. The processors in the multi-processor system 200 according to Embodiment 3 have a feature, similar to Embodiment 1, that a resource can be obtained depending on the status of the other processor.

Figure 11:
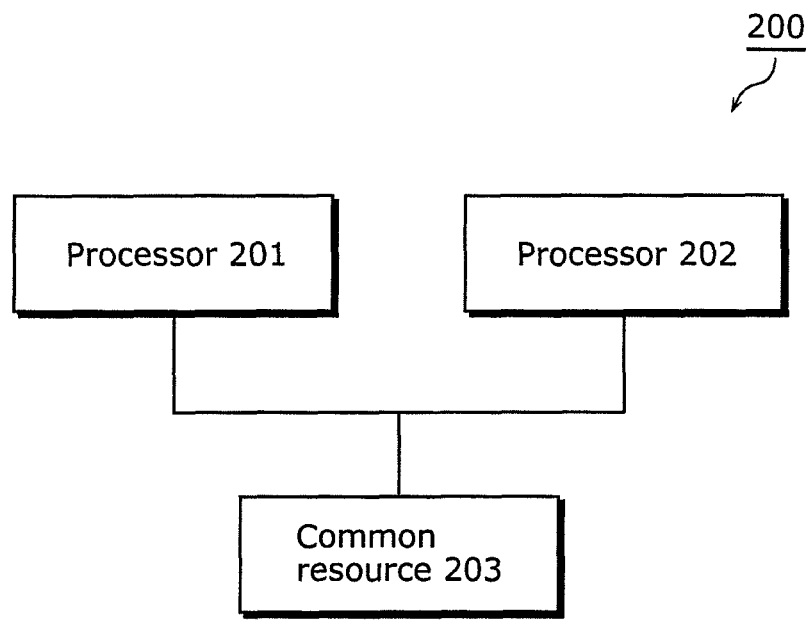
FIG. 11 is a diagram illustrating an example of a system configuration of a multi-processor system 200 according to Embodiment 3 of the present invention.

FIG. 11 is a diagram illustrating an example of a system configuration of the multi-processor system 200 according to Embodiment 3 of the present invention.

The multi-processor system 200 shown in FIG. 11 includes the processors 201 and 202, and the common resource 203.

The processors 201 and 202 obtain a resource from the common resource 203.

The common resource 203 includes a resource which requires an exclusive control between a plurality of processors, and exclusively provides the processors 201 and 202 with the resource. In other word, the common resource 203 is a resource that is accessible by only one of the processors 201 and 202 at a time. Thus, when the processor 201 accesses the common resource 203, an exclusive control needs to be performed on the processor 202 which has a possibility to access the common resource 203 at the same time.

Figure 12:
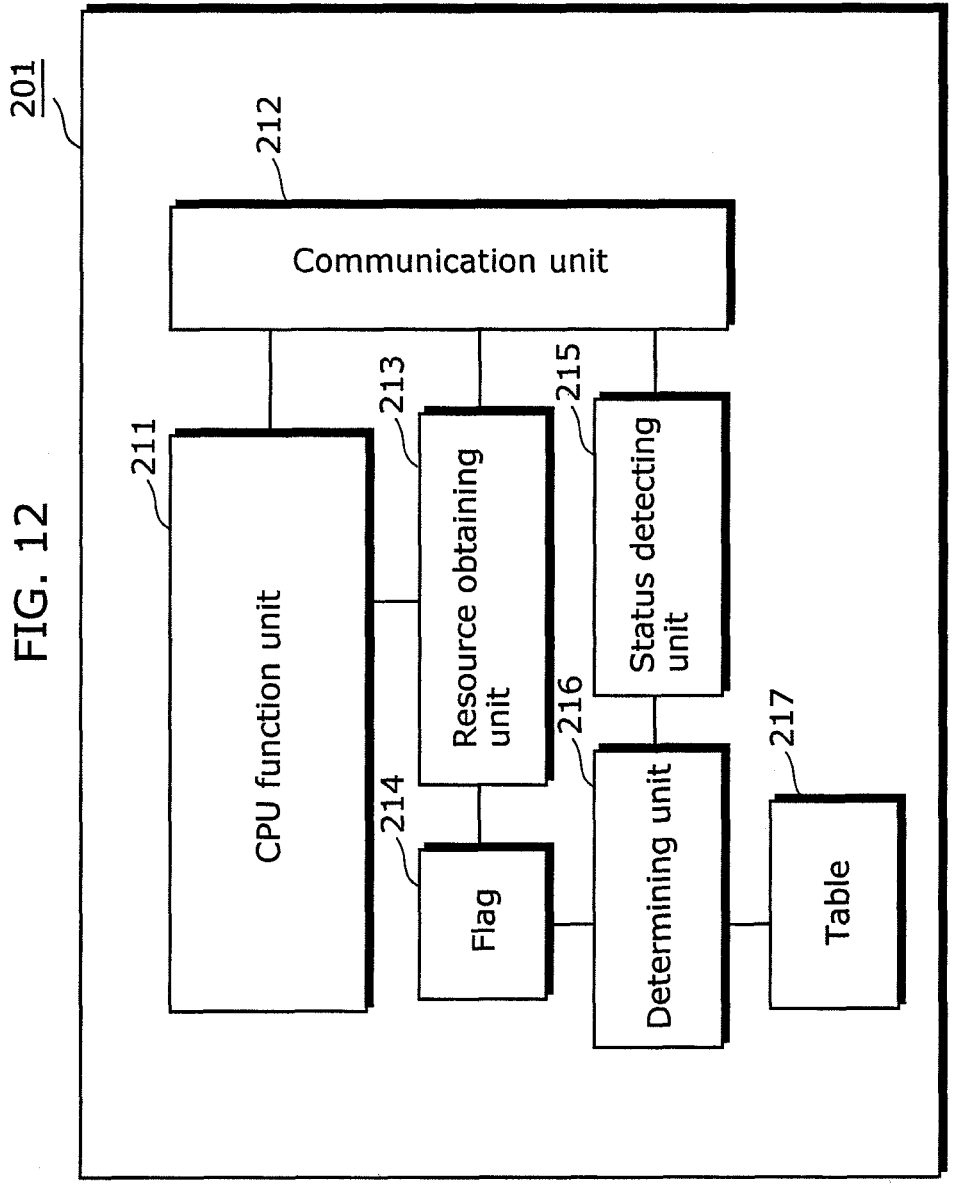
FIG. 12 is a block diagram illustrating an example of a configuration of a processor 201 according to Embodiment 3 of the present invention.

FIG. 12 is a block diagram illustrating an example of a configuration of the processor 201 according to Embodiment 3 of the present invention.

The processor 201 shown in FIG. 12 includes: a CPU function unit 211 which exercises functions of the processor 201; a communication unit 212 which accesses at least the common resource 203; a resource obtaining unit 213 which obtains a resource from the common resource 203; a flag 214; a status detecting unit 215 which detects the status of the processor 202; and the determining unit 216.

The CPU function unit 211 is a function for exercising operating functions of the processor 201.

The communication unit 212 communicates with the common resource 203.

The resource obtaining unit 213 obtains a resource from the common resource 203 via the communication unit 212. The resource obtaining unit 213 refers to the flag 214 and obtains a resource from the common resource 203 when the flag 214 indicates that the obtainment of the resource is permitted.

The status detecting unit 215 detects the status of the other processor, that is, the status of the processor 202.

Here, for example, the status detecting unit 215 may detect the status of the processor 202 by directly referring to the information managed in the operating system (OS) which operates the multi-processor system 200, or by using a system call provided by the OS; however, the detection method is not limitative.

The determining unit 216 also includes a table 217. The determining unit 216 refers to information indicated by table 217 and determines whether or not the resource obtainment unit 213 is permitted to obtain the resource based on the status of the other processor 202.

Here, for example, the table 217 indicates the status of the processor 202, and the priority depending on the status of the processor 202. Furthermore, for example, the table 217 indicates that the status where the processor 202 obtained the resource from the common resource 203 within a predetermined period is the status where a resource is not to be obtained for a predetermined period. In this case, the determining unit 216 determines that the resource obtaining unit 213 is permitted to obtain the resource.

Next, the processing performed in the multi-processor system 200 is described.

Figure 13:
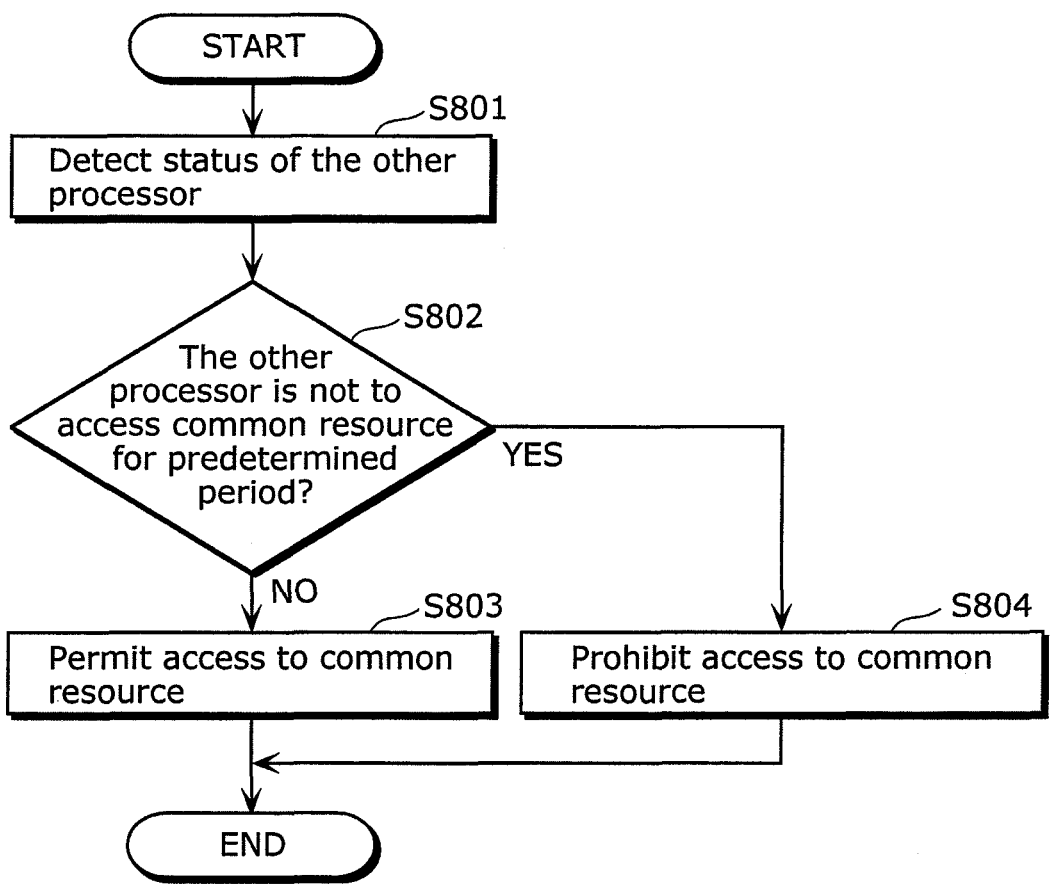
FIG. 13 is a flowchart showing an example of processing performed in the multi-processor system 200 according to Embodiment 3 of the present invention.
Figure 14:
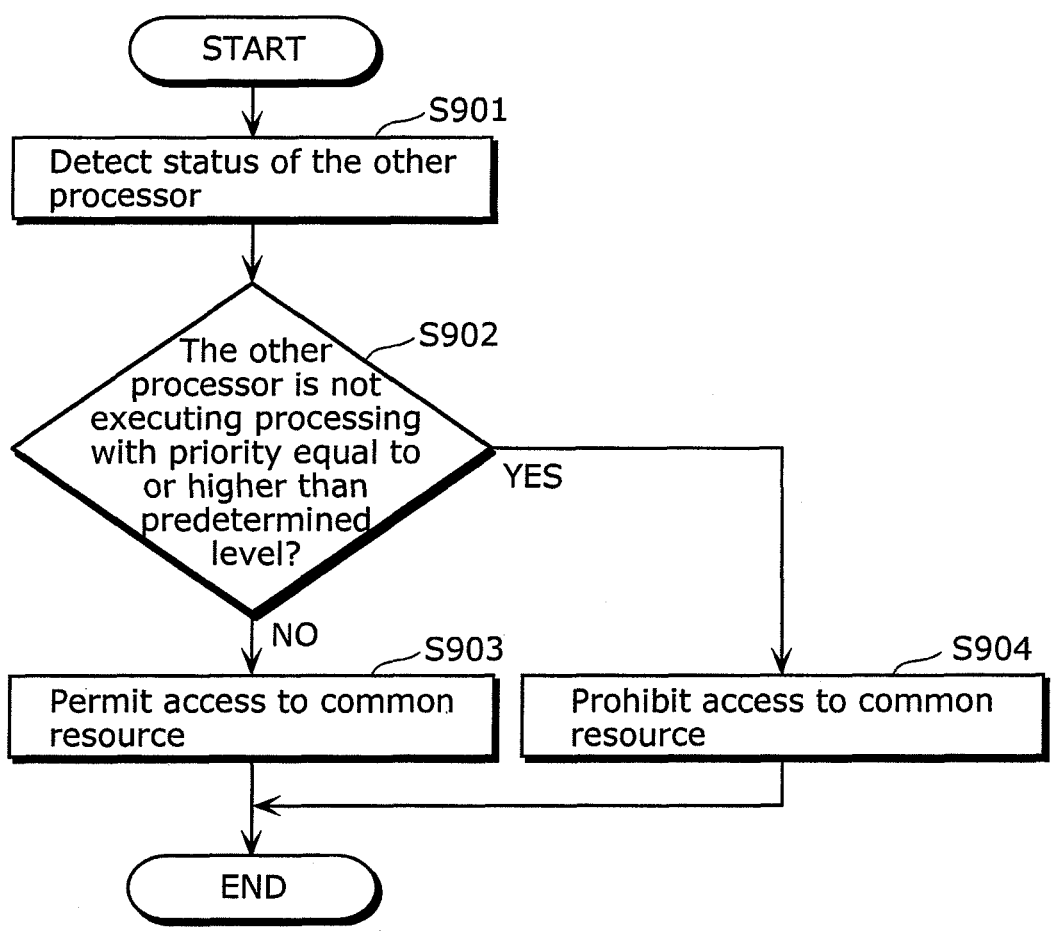
FIG. 14 is a flowchart showing an example of processing performed in the multi-processor system 200 according to Embodiment 3 of the present invention.
Figure 15:
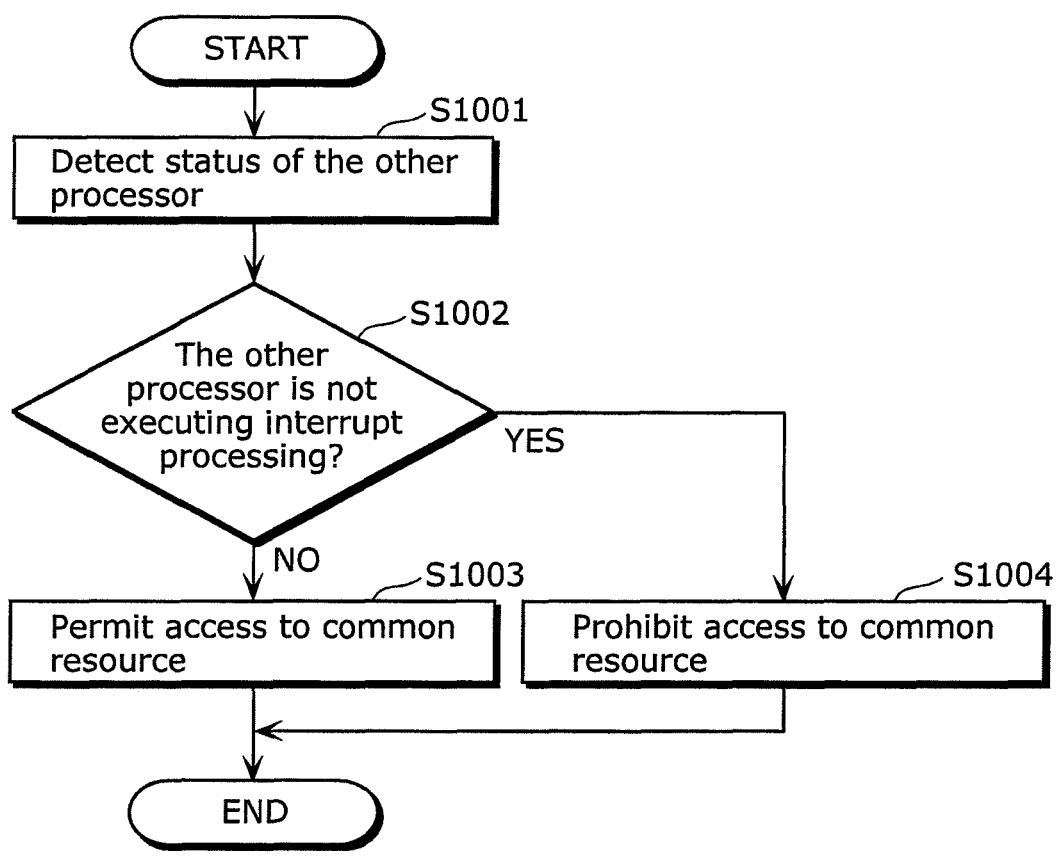
FIG. 15 is a flowchart showing an example of processing performed in the multi-processor system 200 according to Embodiment 3 of the present invention.

FIGS. 13 to 15 are flowcharts showing examples of processing performed in the multi-processor system 200 according to Embodiment 3 of the present invention.

Hereinafter, an example will be described where the processor 201 makes an access request to the common resource 203 in the multi-processor system 200 shown in FIG. 11.

First, the status detecting unit 215 detects the status of the processor 202 that is the other terminal which has a possibility to access the common resource 203 (S801).

Next, the determining unit 216 determines whether or not the status of the processor 202 detected by the status detecting unit 215 is the status where access is not to be made to the common resource 203 for a predetermined period from the detected time (S802).

Only when determined that the status of the processor 202 detected by the status detecting unit 215 is the status where access is not to be made to the common resource 203 for a predetermined period" from the detected time (No in S802 in FIG. 13), the determining unit 216 switches the flag 214 to indicate that the resource obtaining unit 213 is permitted to obtain a resource from the common resource 203 (S803). In this case, the processor 201 is permitted to access the common resource 203. In this case, the resource obtaining unit 213 of the processor 201 obtains the resource form the common resource 203 via the communication unit 212. The case of Yes in S802 in FIG. 13 is the same as the case of Yes in S202 in FIG. 6, and S804 is the same as the S204; and thus, their descriptions are omitted.

In such a manner, the multi-processor system 200 performs resource exclusion processing.

According to the resource exclusion processing shown in FIG. 13, the processor 202 can secure access to the common resource 203.

Here, in S802, the determination of the status where access is not to be made with the common resource 203 for a predetermined period from the detected time, may be made when the detected status of the processor 202 is in the operating mode where access is not to be made to the common resource 203. In this case, only when the detected status of the processor 202 is in the operating mode where access is not to be made to the common resource 203, the processor 201 is permitted to access the common resource 203.

The reason is that, when the status of the processor 202 is in the operating mode where access is not to be made to the common resource 203, it can be determined that the processor 202 is not to access the common resource 203 for a predetermined period.

Furthermore, it may be that as shown in FIG. 14, only when the detected status of the processor 202 is the status where processing having a priority equal to or higher than a predetermined level is not being executed (No in S902 in FIG. 14), the processor 201 is permitted to access the common resource 203 (S903).

Furthermore, it may be that as shown in FIG. 15, only when the detected status of the processor 202 is the status where interruption processing is not being executed (No in S1002 in FIG. 15), the processor 201 is permitted to access the common resource 203 (S1003). This prevents the processor 202 from waiting for an access to the common resource 203 during the interruption processing.

The details of the processing of S901 to 904, except for S902, and S1001 to 1004, except for S1002, are the same as those of S801 to S804 except for S802; and thus, the detailed descriptions are omitted.

In such a manner, the resource exclusion system 100 shown in FIG. 14 and FIG. 15 performs resource exclusion processing.

The status of the processor 202 that is a condition for permitting the processor 201 to access the common resource 203 may be dynamically changed. This allows setting of most appropriate conditions depending on circumstances, such as whether or not the processing which requires real-time capability is being executed.

As described, according to Embodiment 3, the resource can be obtained depending on the status of the other processor 202. More specifically, by the processor 201 including a unit for detecting the status of the other processor so as to obtain a resource depending on the status of the other processor 202, for example, the processor 201 that is in the state where access has not been established to the common resource 203 can also make the access.

In Embodiment 3, it has been described that the processor 201 includes the communication unit 212, the resource obtaining unit 213, the flag 214, the status detecting unit 215, and the determining unit 216; however, the present invention is not limited to the example. The common resource 203, instead of the processor 201, may include the communication unit 212, the resource obtaining unit 213, the flag 214, the status detecting unit 215, and the determining unit 216. It may also be that the multi-processor 200 other than the processors 201 and 202 and the common resource 203 includes those units.

In Embodiment 3, it has been described that the system includes two processors and a single common resource; however, the present invention is applicable to any systems, as long as the system includes a plurality of processors, and a finite resource which requires K-mutual exclusion between the processors.

For example, a case is assumed where a multi-processor environment includes a plurality of processors each executes a plurality of processing in parallel, and a finite resource which requires K-mutual exclusion between the processors. In such multi-processor environment, a unit processor that is executing processing has a step for detecting the status of another unit processor which is executing another processing, and a step for allowing resource obtainment depending on the status of the other unit processor. For example, when another unit processor is executing processing which requires real-time capability, a unit processor is prohibited from obtaining a resource. As a result, the other unit processor can obtain a resource without degraded real-time capability, thereby executing processing with required real-time capability.

In the case where three or more processors are included, it may be that the status of all of other processors are detected so as to switch whether or not the resource obtainment is permitted depending on the statuses of all the other processors. Furthermore, it may be that the status of a given processor among all the other processors is detected so as to switch whether or not the resource obtainment is permitted depending on the status of the given processor.

As described, according to the present invention, it is possible to achieve a system and a device for exclusively controlling resources, which allow establishment of communication (access) for emergency contact without degraded response, even in devices such as mobile terminals or processors that are in the status where communication (access) has not yet been established.

The resource exclusive control system and the device according to the present invention have been described based on Embodiments; however, the present invention is not limited to these Embodiments. The present invention can be achieved not only as a device, but also as an integrated circuit which includes processing units of the device, a method having the processing units of the device as steps, or a computer program which causes a computer to execute the steps. Such program may be distributed via a recording medium such as a CD-ROM, or a communication medium such as the Internet.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The present invention is applicable to systems, devices, methods, and programs for exclusively controlling resources, and in particular, to a system, a device, a method, and a program for exclusively controlling resources, such as: a communication terminal having a common resource; a mobile terminal including a mobile phone, a PHS, a PDA, a handheld game console, and a laptop; a fixed terminal including a digital television, a DVD recorder, a game console; or a multi-processor incorporating a plurality of processors.

What is claimed is:

1. A device which obtains a resource which is exclusively controlled between said device and an other device, said device comprising:
   a status detector configured to detect a status of the other device;
   a resource obtainer that includes flag information and is configured to obtain the resource based on the flag information, the flag information indicating whether the obtainment of the resource is permitted or prohibited; and
   a switch determiner configured to switch the flag information to indicate whether the obtainment is permitted or prohibited, based on the status of the other device detected by said status detector,
   wherein said resource obtainer is prohibited from obtaining the resource when the flag information indicates that the obtainment is prohibited,
   wherein said switch determiner is configured to switch the flag information to indicate that the obtainment is permitted, when the status of the other device detected by said status detector indicates that the resource is not to be obtained for a predetermined period,
   said status detector includes a communication history recorder that records communication history of the other device, and
   said status detector detects the status of the other device based on the communication history,
   wherein the status detector detects whether the other device has a possibility to continuously communicate with the resource based on the communication history recorded in the communication history recorder, and whether the other device is in a status that a communication was made with the resource within a past predetermined period,
   wherein the switch determiner determines that the other device is in the status where the resource is not to be obtained for the predetermined period, either when the status detector detects that the other device does not have a possibility to continuously communicate with the resource, and that the other device is in a status that the communication was made within the past predetermined period, or when the status detector detects that the other device has a possibility to continuously communicate with the resource, and that the other device is in a status that the communication was not made within the past predetermined period.

2. The device according to claim 1,
wherein, when the status detector detects that the other device is in an operating mode where the resource is not to be obtained, said switch determiner is configured to determine that the other device is in the status where the resource is not to be obtained for the predetermined period, and to switch the flag information to indicate that the obtainment is permitted.

3. The device according to claim 1,
wherein each of said device and the other device holds a priority of at least its own device, the priority indicating a priority level of a device that can obtain the resource,
said status detector is configured to detect, as the status of the other device, the priority held by the other device, and
said switch determiner is configured to switch the flag information to indicate that the obtainment is permitted, when the status of the other device detected by said status detector indicates that the priority of the other device is equal to or lower than a predetermined level.

4. The device according to claim 3,
wherein the priorities of said device and the other device are dynamically changed depending on usage statuses of said device and the other device.

5. The device according to claim 3,
wherein the priority of said device can be changed by a user of said device and the priority of the other device can be changed by a user of the other device.

6. The device according to claim 1,
wherein the status of the other device detected by said status detector can be changed by a user of said device.

7. The device according to claim 1,
wherein the status of the other device detected by said status detector can be dynamically changed depending on a usage status of said device.

8. The device according to claim 1,
wherein each of said device and the other device is a communication terminal which obtains a communication resource as the resource.

9. The device according to claim 1,
wherein each of said device and the other device is a processor.

10. A system for exclusively controlling a resource, said system comprising a first device and a second device,
wherein said first device or said second device obtains the resource which is exclusively controlled between said first device and said second device,
wherein said first device includes:
a status detector configured to detect a status of said second device;
a resource obtainer which includes flag information and is configured to obtain the resource based on the flag information, the flag information indicating whether the obtainment of the resource is permitted or prohibited; and
a switch determiner configured to switch the flag information to indicate whether the obtainment is permitted or prohibited, based on the status of said second device detected by said status detector,
wherein said resource obtainer is prohibited from obtaining the resource when the flag information indicates that the obtainment is prohibited,
wherein said switch determiner is configured to switch the flag information to indicate that the obtainment is permitted, when the status of the other device detected by said status detector indicates that the resource is not to be obtained for a predetermined period,
said status detector includes a communication history recorder that records communication history of the other device, and said status detector detects the status of the other device based on the communication history, wherein the status detector detects whether the other device has a possibility to continuously communicate with the resource based on the communication history recorded in the communication history recorder, and whether the other device is in a status that a communication was made with the resource within a past predetermined period, wherein the switch determiner determines that the other device is in the status wherein the resource is not to be obtained for the predetermined period, either when the status detector detects that the other device does not have a possibility to continuously communicate with the resource, and that the other device is in a status that the communication was made within the past predetermined period, or when the status detector detects that the other device has a possibility to continuously communicate with the resource, and that the other device is in a status that the communication was not made within the past predetermined period.

11. A method for exclusively controlling a resource, the method being performed by a device that obtains the resource which includes flag information and which is exclusively controlled between the device and an other device, the flag information indicating whether the obtainment of the resource is permitted or prohibited, the method comprising:

detecting a status of the other device;

switching the flag information to indicate whether the obtainment is permitted or prohibited, based on the status of the other device detected in the detecting; and obtaining the resource based on the flag information, wherein in the obtaining, the obtainment of the resource is prohibited when the flag information indicates that the obtainment is prohibited, wherein each of the device and the other device is a processor, the device and the other device form a single system, in the switching, the flag information is switched to indicate whether the obtainment is permitted or prohibited, based on the status of the other processor detected in the detecting, in the switching, the flag information is switched to indicate whether the obtainment is permitted, when the status of the other processor, detected in the detecting, indicates that the resource is not to be obtained for a predetermined period, in the detecting, the status of the other processor is detected based on a communication history of the other processor, wherein in the detecting, it is detected whether the other processor has a possibility to continuously communicate with the resource based on the communication history, and whether the other processor is in a status that a communication was made with the resource within a past predetermined period, wherein in the switching, it is determined that the other processor is in the status where the resource is not to be obtained for the predetermined period, either it is detected that the other processor does not have a possibility to continuously communicate with the resource, and that the other processor is in a status that the communication was made within the past predetermined period, or when it is detected that the other processor has a possibility to continuously communicate with the resource, and that the other processor is in a status that the communication was not made within the past predetermined period.

12. The method according to claim 11,
wherein, in the detecting, the status of the other processor is detected by referring to information managed by an operating system (OS) for operating the system.

13. The method according to claim 12,
wherein, in the detecting, the information managed by the OS is referred to by a system call provided by the OS.

14. The method according to claim 11,
wherein, in the switching, it is determined that the other processor is in the status where the resource is not to be obtained for the predetermined period and the flag information is switched to indicate that the obtainment is permitted, when it is detected in the detecting that the other processor is in an operating mode where the resource is not to be obtained.

15. The method according to claim 11,
wherein the system further includes
a table indicating priorities according to the statuses of the processor and the other processor, and
in the switching, the flag information is switched to indicate that the obtainment is permitted, when reference to the table shows that the status of the other processor detected in the detecting indicates that processing with a priority higher than a predetermined level is not being executed.

16. The method according to claim 15,
wherein, in the switching, it is determined that the other processor is in the status where the processing with the priority higher than the predetermined level is not being executed and the flag information is switched to indicate that the obtainment is permitted, when it is detected in the detecting that the other processor is in the status where interrupt processing is not being executed.

17. The method according to claim 11,
wherein, in the detecting, statuses of all processors other than the processor are detected as the status of the other processor.

18. The method according to claim 11,
wherein, in the detecting, a status of a given processor, of all other processors other than the processor, is detected as the status of the other processor.

19. The method according to claim 11,
wherein the status of the other processor detected in the detecting is dynamically changed depending on a usage status of the processor.

* * * * *